United States Patent [19]
Fels

[11] 3,870,518
[45] Mar. 11, 1975

[54] METHOD OF TRANSFERRING PHOTOGRAPHIC FILM BETWEEN CASSETTE AND AN EXPOSURE DRUM

[75] Inventor: Werner, Fels, Kiel, Germany
[73] Assignee: Dr. Ing Rudolf Hell GmbH
[22] Filed: Feb. 26, 1973
[21] Appl. No.: 335,956

[30] Foreign Application Priority Data
Feb. 29, 1972 Germany.......................... 2209515

[52] U.S. Cl................. 96/27 R, 355/104, 354/174, 354/181
[51] Int. Cl............................................. G03c 5/04
[58] Field of Search............ 95/24, 31 CA; 355/104; 354/174, 181

[56] References Cited
UNITED STATES PATENTS
| 256,966 | 4/1882 | Brown..................................... 95/24 |
| 362,978 | 5/1887 | Krementz................................ 95/24 |
| 2,017,096 | 10/1935 | Hogan................................. 95/31 CA |
| 3,578,862 | 5/1971 | Hudock et al....................... 355/104 |
| 3,673,943 | 7/1972 | Corrigan............................. 354/181 |

FOREIGN PATENTS OR APPLICATIONS
1,310,984  1/1962  France................................ 355/104

Primary Examiner—David Klein
Attorney, Agent, or Firm—Hill, Gross, Simpson, Van Santen, Steadman, Chiara & Simpson

[57] ABSTRACT

A method of handling film before and after exposure comprising mounting unexposed film in a cassette, mounting the cassette on a housing of exposure reproduction apparatus having therein a rotary film carrying drum, shifting a closure on the cassette to effect communication between the interior of the housing through an access opening therein, transferring the film from the cassette through the opening into engagement with the drum and rotating the drum to withdraw the film from the cassette. The film is then exposed while on the drum, the drum reversed and the film returned into the cassette, the cassette closed and then removed from the housing.

5 Claims, 7 Drawing Figures

METHOD OF TRANSFERRING PHOTOGRAPHIC FILM BETWEEN CASSETTE AND AN EXPOSURE DRUM

This invention relates to a method of handling film before and after exposure, and more particularly concerns transferring photographic film between a cassette and an exposure drum.

An apparatus for producing reproductions, such as for image transfer or for effecting color separation for multi-color printing, and utilizing a rotating recording or exposure drum, commonly employs film material mounted upon the drum. Exposure of the film material during the reproduction process is effected by means of a light beam. Hence there is the problem of application of the unexposed film material and subsequent removal of the exposed film material with respect to the drum.

In most prior apparatus, the film-supporting drum is arranged fixedly in a lightproof housing and the film can be mounted on and removed from the drum only through a closure in the housing while the space surrounding the apparatus is maintained dark. This is a drawback and is time-consuming because the film must be transferred manually and the drum and the apparatus must therefore be installed in a darkroom or within a dark tent or other enclosure.

Even where the film material is transported in a cassette, the problem has persisted due to the heretofore necessity for transferring the film material manually in a darkroom. Such transfer of the film material is a drawback. For proper results, precision in coupling the film material to the drum is desirable but because the film material is generally attached manually with the aid of adhesive tape or mounting brackets on the drum, many errors in applying the film material to the drum may result in failure due to separation of the material from the drum due to centrifugal forces in operation, or at least during rotation of the drum as is customary.

Heretofore transfer of photographic material from a cassette into a development system has been practiced. Such cassettes are utilized for X-ray films and comprise a flat, dish-like container for receiving the film sheet with a hinged closure normally closing the cassette lightproof and being adapted to open when the cassette is mounted in the developing apparatus for removal of the film which is effected by actuation of a hand crank at the cassette or by means of friction rollers which become effective during insertion of the cassette into the developing apparatus and which are actuated by a drive provided in the apparatus. In such cassettes, however, the film material is not removed from the cassette for exposure purposes because due to the property of X-rays it is possible to expose the film within the cassette. While it is true that in the developing apparatus the film is automatically transferred from the cassette, such transfer is without any precision since the film is merely guided into a developing bath. Such cassettes are not, however, intended for nor suitable for accomplishing transfer of the film material to and between the cassette and an exposure drum.

An important object of the present invention is to overcome the foregoing and other disadvantages, deficiencies, inefficiencies, shortcomings and problems in prior methods and apparatus and to attain important new and improved advantages in the handling of photographic film material in respect to drum exposure of such material.

Another object of the invention is to provide a new and improved method of handling film before and after exposure, and more particularly transferring photographic film to and between a cassette film holder and an exposure drum.

A further object of the invention is to provide new and improved method of handling photographic film for exposure on a drum in reproduction apparatus.

A yet further object of the invention is to provide new and improved method of automatic film transfer between a holder and an exposure device avoiding any need for a darkroom for the purpose, thereby attaining substantial advantages in compactness and in simplification of the apparatus and more particularly the housing structure for photographic reproduction apparatus.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 4 is an enlarged fragmentary sectional elevational view illustrative of the relationship of the film supporting register pins during transfer of the film material relative to the recording drum;

FIG. 7 is an enlarged fragmentary lonitudinal sectional view through one of the register pins on the drum.

According to the present invention, photographic film is readily transferred to and between a film holder and a recording or exposure drum in a manner which requires no manual handling of the film during transfer, but accomplishes the transfer automatically in a thoroughly lightproof manner. The film is transferred from the holder to the drum in one direction of rotation of the drum and is transferred from the drum to the holder during rotation of the drum in the opposite direction. Simple manual control of the operating mechanism is provided for.

Figure 1:
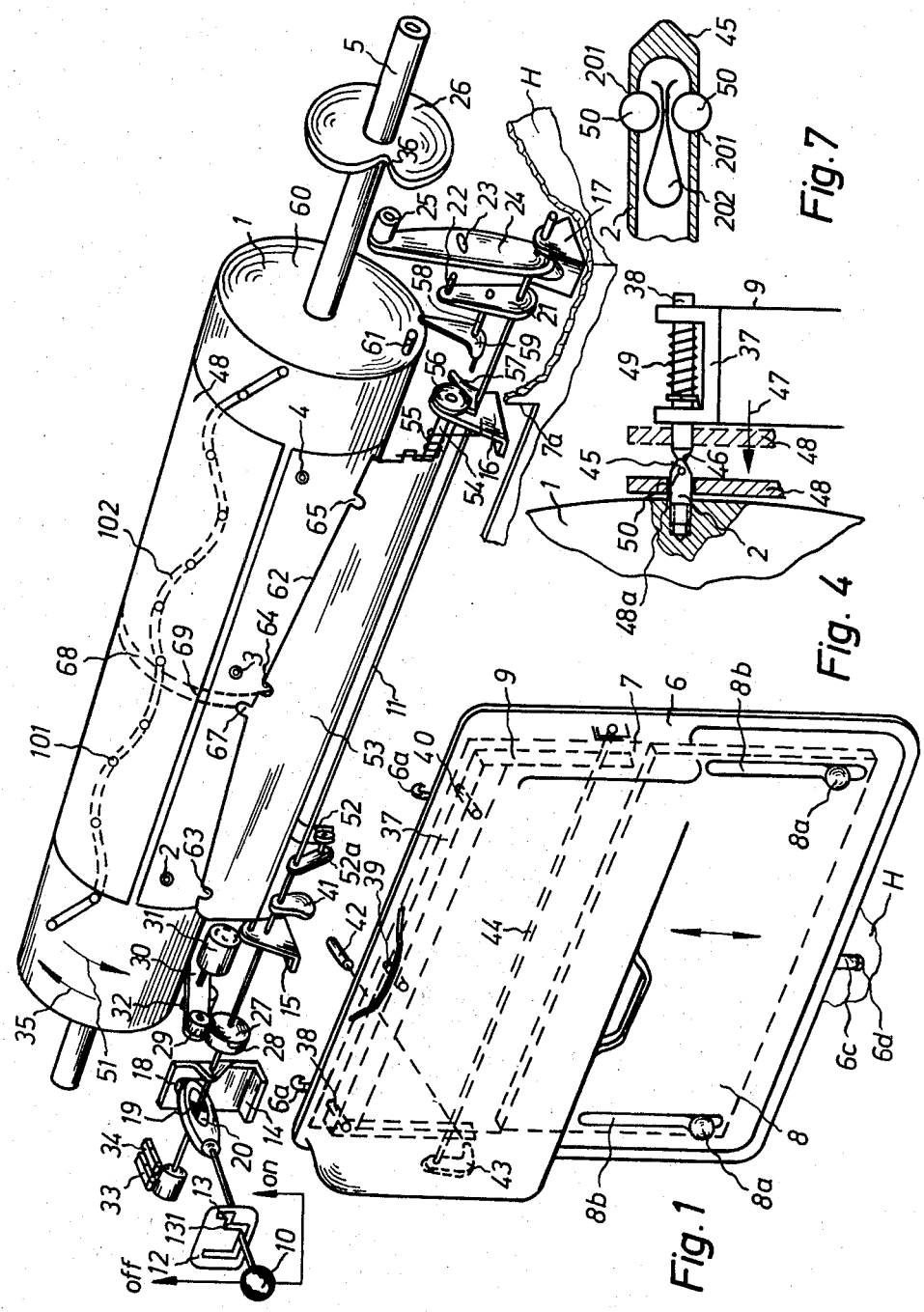
FIG. 1 is an exploded schematic view of an assembly embodying features of the invention.
Figure 2:
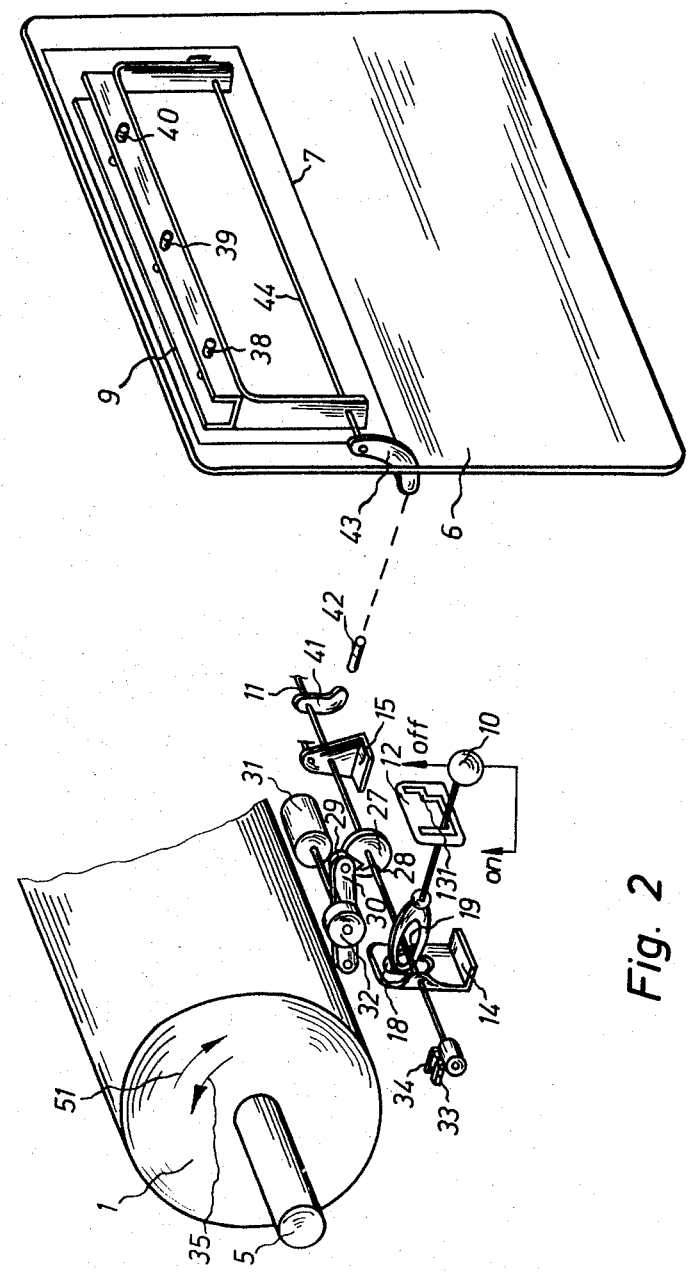
FIG. 2 is a fragmentary schematic exploded isometric view of the assembly viewed from another angle.

Having reference to the drawings, a photographic film recording or exposure drum 1 is depicted of an exposure apparatus which has not been shown in detail. Rotary mounting of the drum 1 is provided for by an axial shaft 5 which is suitably mounted within a normally lightproof housing H of the apparatus and which housing has been shown only fragmentarily and schematically for illustrative purposes (FIGS. 1 and 2). Means on the drum 1 for receiving and holding film material 48 accurately and firmly on the drum perimeter comprise supporting and registration means including a plurality of registration pins 2, 3 and 4 located in spaced relation along a longitudinal line on the drum perimeter to be received in registration holes 48a(FIG. 4) provided in a leading marginal portion of the film sheet. Although three of the registration pins have been shown, the number may be varied as preferred depending on the size of the drum and on the film width to be handled by the drum. In addition, the drum 1 is provided with vacuum film retaining means and for this purpose the shaft 5 is desirably hollow and connected in a suitable manner with a source of vacuum (not shown) which effects a negative pressure or vacuum in the drum so that the film, and more particularly the trailing end portion of the film 48 is sucked against the drum perimeter through suction holes 101 desirably provided in a zig-zag or wavy pattern alignment lengthwise of the drum which has a corresponding communicating internal groove 102. There may be as many sets of the suction holes 101 circumferentially spaced on the drum 1 as desired or necessary to hold the film 48 snugly wrapped on the drum in operation.

For handling of the film 48 before exposure, as well as after exposure, it is supported in a normally lightproof holder or cassette 6 which is constructed and arranged to be mounted on the housing H for transfer of the sheet of film 48 from the cassette onto the drum 1 and then after exposure transfer of the film from the drum to return it to the cassette for further handling such as development of the film. For this purpose, the cassette 6 has a face provided with an opening 7 (FIGS. 1 and 2) which in assembly with the housing H registers with a corresponding opening 7a in the housing, with a suitable lightproofing seal 7b (FIG. 3) between the margins of the cassette face and the housing about the openings assuring freedom from light leakage into the assembly. Any suitable means may be provided for quick releasable attachment of the cassette 6 to the housing H, such as hanger hooks 6a (FIGS. 1 and 3) on the upper margin of the cassette engageable with complementary hanger brackets or lugs 6b on the housing. Means such a detaining or latching finger or bolt 6c on the lower margin of the cassette is engageable with a retaining or keeper member 6d on the housing (FIG. 1). In the film loaded condition of the cassette 6, the access opening 7 therein is closed by means of a slide closure 8 provided with suitable means such as knobs 8a at is lower corners movable through clearance slots 8b in the cassette housing to manipulate the closure between closed and open positions as indicated by a directional arrow in FIG. 1 while the cassette is suspended on the housing H. Within the cassette 6 the film is supported on a mounting frame 9 (FIGS. 1 and 2) carrying registration pins 38, 39 and 40 complementary to the drum pins 2, 3 and 4, respectively, and on which the film 48 is mounted within the cassette by means of the holes 48a through which the pins are received. Rockable mounting of the frame 9 to enable transfer of the film 48 to and between the drum and the cassette is effected by means of a shaft 44 carried within the cassette and supporting the frame in alignment with the opening 7.

After the cassette 6 has been suspended on the housing H with the openings 7 and 7a aligned, and the closure slide 8 opened to provide for communication through the cassette and housing openings, transfer of the film 48 from the cassette to the drum 1 is initiated by actuation of means accessible for manipulation outside of the housing H and in one desirable arrangement comprising a handle lever 10 extending through a guide plate 12 having therein an angular control slot as shown for guiding manipulations of the lever in actuating control means including a longitudinally and rotatably shiftable rod or shaft 11 supported by aligned bearing brackets 14, 15, 16 and 17 (FIG. 1) suitably mounted fixedly within the housing H to maintain the shaft in spaced parallel relation to the drum 1.

As shown in FIGS. 1 and 2, the lever 10 is located in a neutral horizontally extending portion of the control slot and the plate 12. To effect transfer of film from the cassette onto the drum 1, the handle lever 10 is shifted as shown by the directional arrow in the "on" direction to shift it to the right and upwardly into a vertical guidance portion 13 of the guide slot whereby to effect axially rightward shifting of the shaft 11 as well as rocking of the shaft in a clockwise direction as viewed in FIG. 1, and counterclockwise as viewed in FIG. 2. For this purpose, the inner end of the handle lever 10 is universally pivotally engaged in a recess 18 in the bracket 14 and the lever is coupled to the shaft 11 by means of a pin 19 extending across an eye 20 in the inner end portion of the lever.

As the shaft 11 shifts to the right, a radially extending lever arm 21 fixedly on the right-hand end portion of the shaft between the brackets 16 and 17 is correspondingly shifted to move a rightwardly extending coupling 10 on its distal end portion into an intermediate slot 23 in a lever 24 which is pivotally mounted in the bracket 17 on the axis of the shaft 11. Then, on rocking of the shaft 11 to the "on" position by action of the handle lever 10, the coupling through the arm 21 and pin 22 causes the lever 24 to rock correspondingly and carry a pin 25 on its distal end portion, projecting away from the drum 1, into edge cooperation with a cam disk 26 fixedly corotatably mounted on the drum shaft 5.

As the lever 10 is lifted in the "on" direction, the corresponding actuation of the shaft 11 also effects operation of drum driving means, To this end, the shaft 11 has fixedly corotative therewith a cam wheel 27 between the brackets 14 and 15 and which wheel has in its perimeter a notch 28 in which is engaged in the neutral position of the wheel a follower 29 on the distal end portion of a lever 30 which is pivotally mounted on a fixed pivot relative to the housing H at its opposite end and intermediately rotatively carries a friction wheel 32 which is driven by a motor 31. As the shaft 11 is shifted toward the right during the "on" movement of the handle lever 10, energizing of the motor 31 is effected by means of contacts 33 and 34 in a suitable electrical circuit with the motor. In such "on" movement, the cam roller or wheel 27 is rotated to move the follower 29 out of the notch 28 and swing the lever 30 toward the drum 1 so that the friction wheel 32 now driven by the motor 31 will engage the drum and drive the drum rotatably in the direction of the arrow 35.

Figure 3:
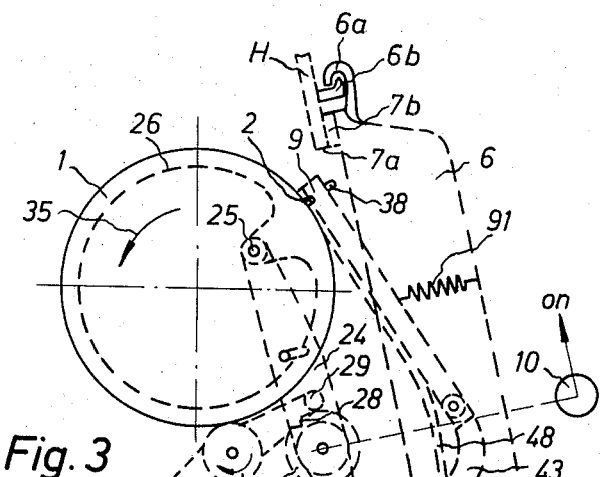
FIG. 3 is a schematic illustration of the assembly showing the same in the relationship of film transfer.

As the drum starts to rotate in the direction of the arrow 35 (FIGS. 1 and 3), the follower pin 25 of the lever 24 riding on the cam edge of the disk 26 reaches a cam notch 36 into which it drops, thus permitting a further degree of clockwise rotation of the shaft 11 as viewed in FIG. 1 and counterclockwise as shown in FIG. 3 and during which movement the handle lever 10 is manually shifted to the limit of the slot control leg 13. Location of the cam notch 36 is indexed with respect to the registration pins 2, 3 and 4 on the drum so that such pins will be opposite the film-carrying frame 9 in such alignment that the upper part of the frame having the registration support bar 37 carrying the pins 38, 39 and 40 as, in effect, radial extensions of the registration pins 2, 3 and 4 of the drum can be moved to effect film transfer alignment of the drum and frame pins.

Means for rocking the frame 9 about its shaft 44 into the film transferring position relative to the drum 1 comprise a thrust arm lever 41 fixedly corotatably mounted on the shaft 11 in alignment with a reciprocable thrust pin 42 carried by the cassette 6. As the follower 25 drops into the cam notch 36, the lever arm 41 drives the pin 42 against a rock lever 43 fixedly corotatively mounted on the frame shaft 44 on which the frame 9 is fixedly rockably mounted. Thereby the frame 9 is rocked about the axis of the shaft 44 to tilt the frame outwardly from the cassette openings 7 in opposition to the bias of a return spring 91, as shown in FIG. 3, to engage the tips of the registration pins 38, 39 and 40 of the film mounting frame 9 into engagement with the tips of the registration pins 2, 3 and 4 of the drum, respectively. To assure firm, accurate engagement of the pins, the tips of the pins 2, 3 and 4 are conically tapered to dull points and engage in complementary recesses in tapered tips 46 of the pins 38, 39 and 40.

After the register pins have engaged in film transferring contact of the tips 45 and 46 as visualized in FIG. 4, continued movement of the frame 9 toward the drum 4, as indicated by directional arrow 47, effects transfer of the film 48 from the pins 38, 39 and 40 onto the pins 2, 3 and 4. For this purpose, the pins 38, 39 and 40 are reciprocably mounted on the frame bar 37 and are shifted against the bias of respective springs 49 retractably relative to the frame bar until the film 48 is pushed by the frame off the pins 38, 39 and 40 onto the pins 2, 3 and 4.

Unintended release of the film 48 from the pins 2, 3 and 4 is prevented after transfer of the film thereto by detent means carried by these pins. In an advantageous construction as shown in FIGS. 4 and 7, showing the pin 2, the pins are hollow and have detent balls 50 arranged to project partially outwardly through aligned bores 201 of slightly smaller diameter than the diameter of the balls and through which these balls are normally biased by means of a spring 202. Thereby, after the film 48 has been moved from the supported relation on the pins 38, 39 and 40 as shown in dash outline in FIG. 4 to the full line position on the pins 2, 3 and 4, the frame 9 can be rocked back to its position within the cassette 6 and the film will be held against unintended displacement from the drum 1 on the pins 2, 3 and 4.

Figure 5:
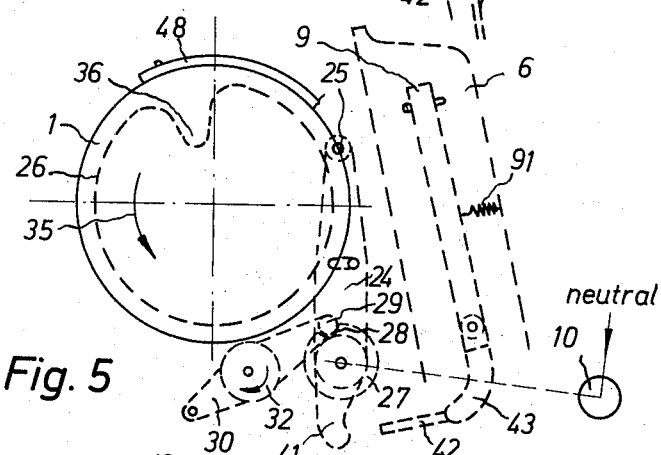
FIG. 5 is a schematic illustration showing the assembly after transfer of the film to the drum and the drum now in normal operation.

Return of the film mounting frame 9 into the cassette 6 under the bias of the return spring 91 occurs in response to shifting of the handle lever 10 into an intermediate dwell position in an angular portion 131 of the slot leg 13, whereupon the shaft 11 is rocked to release the lever arm 41 from the thrust pin 42 and thereby releasing the lever arm 43 so that the frame 9 is pulled back into the cassette by the spring 91. Further, this causes the pin 25 to leave the cam recess or notch 36. In the intermediate position 131, the friction wheel 32 is still pressed against the drum 1 so that it can continue rotation which was interrupted by engagement of the pin 25 in the notch 36. As the drum 1 continues rotating in the direction of the arrow 35, the film 48 now supported on the pins 2, 3 and 4 of the drum 1 is pulled out of the cassette 6 and wrapped about the perimeter of the drum, preferably by means (not shown) which presses the film against the surface of the drum. Such means may be associated with the vacuum holes 101. After the film material 48 has been fully received upon the drum 1 the lever 10 is released to its neutral position in the guide slot in the plate 12, whereby the pin 22 is released from the lever 24 and the motor circuit contacts 33 and 34 are returned to the disconnect relation and the motor 31 deenergized. Hence, the neutral position of the transfer device, as shown in FIG. 5, will result, and the reproduction apparatus can take over for exposure of the film 48 carried by the drum which is now driven through the shaft 5 by means (not shown) of the apparatus.

Figure 6:
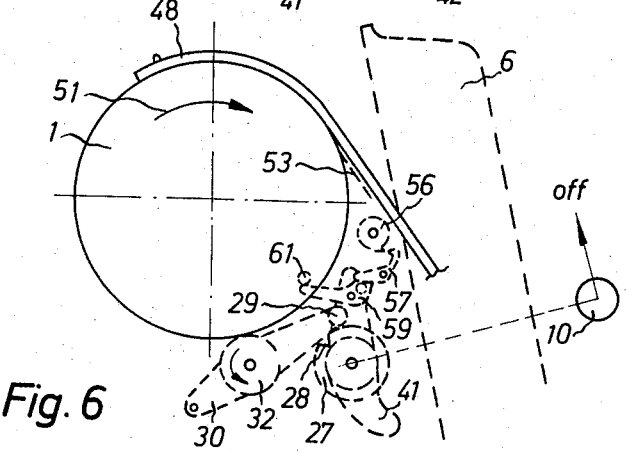
FIG. 6 is a schematic view illustrating the relationship of means of the assembly during transfer of the film from the drum into the film holder or cassette.

After recording on the film has been completed, the film material 48 can be returned to the cassette 6 for transportation to a darkroom for development. For this purpose, after the drum 1 has been stopped at conclusion of the exposure process, the handle lever is shifted in the direction of the "off" arrow (FIGS. 1 and 6) wherein it engages in a left-hand vertical leg of the guide slot in the plate 12. This causes the shaft 11 to be shifted toward the left by virtue of the coupling pin 19, thereby the pair of control contacts 33 and 34 are actuated to control switches for the motor 31 to energize the motor in reverse to the direction in which it rotated during transfer of the film from the cassette to the drum. As the shaft 11 is rotated in the "off" movement of the hand lever 10, the pin 29 is lifted from the groove 28 of the cam wheel 27 so that the friction drive wheel 30 pressing against the drum 1 and driven by the motor 31 will drive the drum in the direction of the arrow 51 in FIG. 1. At the same time, a control stop 52 of a film stripping blade 53 is released from a depressor 52a carried by the shaft 11. Thereby the blade 53 can rock about the axis of a shaft 54 on which it is fixedly mounted and which is rotatably supported by and between the bearing brackets 15 and 16 parallel to the shaft 11. Initially as the shaft 11 is shifted axially and releases the depressor 52a from the stop arm 52, a releasable latch device holds the stripper blade 53 separated from the drum 1 and in opposition to bias of a torsion spring 55, the latch comprising a ratchet wheel 56 corotatable with the shaft 54 and normally latchingly engaged by a pawl 57. To release the latch pawl 57, the lever arm 21 carries a stud 58 on which there is mounted a latch release lever 59 shiftable in the axial movements of the shaft 11 into and out of operating relation to the latch pawl 57. As the handle lever 10 moves the shaft 11 toward the left, the release lever 59 is moved into operating alignment with the pawl 57. Rotation of the drum 1 in the direction of the arrow 51 carries an indexing stud 61 on its end nearest the release lever 59 into tripping engagement with the release lever immediately after the film retaining pins 2, 3 and 4 on the drum 1 have passed the stripper edge of the blade 53. Engagement of the stud 61 against the release lever 59 trips this lever and drives it into tripping, releasing engagement with the latch pawl 57 to release it from the ratchet wheel 56 so that the biasing spring 55 causes the blade 53 to swing on its shaft and engage the stripper edge 62 of the blade pressingly against the perimeter of the drum 1. To clear the pins 2, 3 and 4, the blade edge 62 has clearance notches 63, 64 and 65, respectively.

In order to assure stripping of the film 48 by engagement of the blade 53 between the unattached trailing edge of the reversely moving film member and the drum, the blade 62 is provided with a protuberance at or adjacent the central portion of the blade to engage in a groove 68 circumferentially in the drum and thereby engage under the end of the film at the point 69 and lift the same away from the drum. In order to facilitate the stripping action of the blade edge 62, such edge is preferably of generally V-shaped converging toward the protuberance finger 67. As the drum 1 is rotated by the friction wheel 32 in the direction of the arrow 51, the stripper blade 53 guides the film 48 in return direction through the opening 7a in the housing H and the access opening 7 in the cassette and then when the retaining pins 2, 3 and 4 are reached, the blade strips the film from the pins past the yieldable detents 50 thereon and the film drops from the drum into the cassette, the pins moving freely and without interruption through the respective clearance notches 63, 64 and 65 in the blade edge. The drum can then be stopped by returning the handle lever 10 to its neutral position and thereby neutralizing the drum actuating and shifting mechanism until another cycle of operation is to be performed. The cassette 6 with the exposed film transferred back from the drum thereinto can then be closed by shifting the slide 8 into the closing position relative to the opening 7. Then the cassette 6 can be removed from the housing 8 for transportation of the film to a development station.

Instead of utilizing a manual operating control arrangement such as the handle lever 10, the various axial shiftings and rotary movements of the shaft 11 may be effected by means including actuating magnets or solenoids to accomplish the axial shifting of the shaft and an eccentric or a servo-motor for rotating the shaft.

Although minor modifications might be suggested by those versed in the art, the should be understood that I wish to embody within the scope of the patent warranted hereon all such modifications as reasonably and properly come within the scope of our contribution to the art.

I claim as my invention:

1. A method of handling film before and after exposure, comprising:

mounting unexposed film on a shiftable film supporting frame within a cassette having an access opening normally closed by a shiftable closure;

mounting the cassette on a housing of an exposure reproduction apparatus with the access opening of the cassette in registration with an access opening into the housing;

shifting said closure to open the cassette access opening to provide for communication between the openings;

shifting said frame carrying the film through the aligned openings into the housing;

within the housing transferring the film from the frame to a rotary drum;

shifting the frame back into the cassette;

rotating the drum to fully withdraw the film from the cassette;

exposing the film while the drum continues in rotation;

reversing the direction of rotation of the drum;

stripping the film from the drum and guiding the film during such reversal of rotation of the drum to return the film into the cassette;

shifting said closure to close the access opening in the cassette;

and removing the cassette from the housing.

2. A method of handling film before and after exposure, comprising:

mounting pieces of cut film on a shiftable film supporting frame within a cassette by registering preformed holes in the film on spaced registration pins on a leading end portion of the frame;

closing an access opening into the cassette with a shiftable closure;

mounting the cassette on the housing of an exposure reproduction apparatus with the cassette access opening in registration with an access opening into the housing;

shifting said closure to open the cassette access opening for communication between the inside of the cassette and the inside of the housing through said openings;

shifting said film supporting frame leading end first from the cassette through said openings into said housing;

within the housing placing the pins on the supporting frame in registration with complementary film engaging pins on a rotary drum;

transferring the film from the pins on the frame to the pins on the drum;

rotating the drum to effect withdrawal of the film from the cassette through the engagement of the film by the pins on the drum and wrapping the film onto the drum;

exposing the film within the housing;

reversing rotation of the drum and guiding the exposed film through said openings in returning direction into said cassette;

stripping the film from the pins on the drum and fully depositing the exposed film in the cassette; shifting said closure into closing relation to said cassette opening;

and removing the cassette from the housing.

3. A method according to claim 2, wherein the leading end portion of the film is held in place on the drum by the pins on the drum, and retaining the trailing end portion of the film against the drum by suction whereby to maintain the film wrapped on the drum during exposure within the housing.

4. A method of handling film before and after exposure, comprising:

mounting into a cassette through an access opening therein unexposed cut film;

shifting a closure carried by the cassette into closing relation to the opening;

mounting the cassette on a housing of exposure reproduction apparatus having therein a rotary film carrying drum and with said cassette access opening in registration with an opening into the housing;

shifting the closure to open the cassette opening to effect communication between the interior of the cassette and the interior of the housing through said opening;

transferring the film leading end first from the cassette through said openings into engagement with said drum and securing the leading end portion of the film to the drum;

rotating the drum and thereby withdrawing the film from the cassette;

within the housing exposing the film on the drum;

within the housing shifting a stripper blade from an inactive position into stripping position adjacent the trailing end of the exposed film on the drum;

reversing the drum and moving the film in stripping relation over the stripper in return direction through said openings into the cassette;

disengaging the secured end portion of the exposed film from the drum and fully returning the exposed film into the cassette;

shifting the closure to close the access opening into the cassette;

and removing the cassette from the housing.

5. A method according to claim 4, comprising fully wrapping the film onto the drum and leaving a gap between the leading and trailing ends of the film, and moving an end of the stripper blade from normally inactive position into stripping relation in said gap for effecting said moving of the film in stripping relation over the stripper in the reverse rotation of the drum.

* * * * *